United States Patent [19]
Hotomi

[11] Patent Number: 4,890,126
[45] Date of Patent: Dec. 26, 1989

[54] PRINTING HEAD FOR INK JET PRINTER

[75] Inventor: Hideo Hotomi, Osaka, Japan

[73] Assignee: Minolta Camera Kabushiki Kaisha, Osaka, Japan

[21] Appl. No.: 302,382

[22] Filed: Jan. 27, 1989

[30] Foreign Application Priority Data

Jan. 29, 1988 [JP] Japan .................................. 63-20239
Jan. 29, 1988 [JP] Japan .................................. 63-20240

[51] Int. Cl.[4] .......................... G01D 15/18; B41J 3/04
[52] U.S. Cl. ................................................ 346/140 R
[58] Field of Search .................................. 346/140, 75

[56] References Cited

U.S. PATENT DOCUMENTS

| | | | |
|---|---|---|---|
| 4,296,421 | 10/1981 | Hara et al. | 346/140 |
| 4,368,476 | 1/1983 | Oehara | 346/140 |
| 4,376,945 | 3/1983 | Hara et al. | 346/140 |
| 4,417,251 | 11/1983 | Sugitani | 346/1.1 |
| 4,504,844 | 3/1985 | Ebi | 346/140 |
| 4,707,705 | 11/1987 | Hara et al. | 346/75 |
| 4,725,862 | 2/1988 | Matsuzaki | 346/140 |
| 4,751,532 | 6/1988 | Fujimura | 346/140 |
| 4,801,955 | 1/1989 | Miura | 346/140 |

OTHER PUBLICATIONS

Kotla et al.; Bimetallic Differential-Wetting Piezoelectric Printing Device; IBM TDB V15, N5, Oct. 1972, pp. 1418-19.

*Primary Examiner*—Joseph W. Hartary
*Attorney, Agent, or Firm*—Burns, Doane, Swecker & Mathis

[57] ABSTRACT

A printing head for use in an ink jet printer having a head body formed of a photosensitive polyimido resin, a plurality of grooves defined in the head body and an upper plate to be disposed on the head body for covering the grooves for forming a plurality of ink passages. An ink opening area of the ink passage is coated with an ink-phobic organic plasma polymer film while a remaining area of the passage is coated with an ink-philic organic plasma polymer film. When a water-based ink is employed, the ink-philic organic plasma polymer film may contain oxygen atoms and/or nitrogen atoms while the ink-phobic organic plasma polymer film may contain halogen atoms. When an oil-based ink is employed, the ink-philic organic plasma polymer film may contain halogen atoms while the ink-phobic organic plasma polymer film may contain oxygen atoms and/or nitrogen atoms.

10 Claims, 5 Drawing Sheets

PRINTING HEAD FOR INK JET PRINTER

BACKGROUND OF THE INVENTION

The present invention relates to a printing head adopting an ink delivery technique effectively utilizing the capillary phenomenon of ink.

In the printing head of the above-noted type, namely an ink jet head, its ink guide passage for guiding ink and an ink jet opening for jetting ink therethrough are formed conventionally of a photosensitive glass or various ceramic materials.

It has been also suggested to provide the ink guide passage with ink-philic characteristics for improving ink deliverability while providing the ink jet opening with ink-phobic characteristics for restricting ink dripping.

However, if the ink guide passage and the jet opening are formed of an ink-philic resin, after an extended use the ink gradually penetrates the resin, and this penetrated ink eventually expands and deforms these portions. Further, the resin quality may be deteriorated by gradual development of mildew. This deformation and quality deterioration impairs stable and even ink jetting operation. In addition, if the jet opening is formed of ink-philic resin, there occurs disadvantageous dripping of excess ink at this portion.

On the other hand, if the ink guide passage and the jet opening are formed of a photosensitive glass, fine working is impossible because of poor resolution of photosensitive glass. Further, this does not eliminate the mildew development just as in the case with the use of resin.

With view to the above-described inconveniences, it has been also suggested to form the ink guide passage and ink jet opening of different materials by bonding these thereafter or to coat these portions with resin materials of different properties.

However, the bonding of different materials is very difficult and costly. The coating with different resins is also difficult because of the smallness and intricacy of these portions. Moreover, depending on the properties of employed resins, there occur the same inconveniences as described above.

Further, such materials as ceramics naturally have hydrophilic property which limits their use to water-based inks. Thus, if a ceramic material is used, an additional ink-phobic treatment will be effected on the leading end of the jet opening, whereby the same problems as above will occur again.

On the other hand, the ink delivery passage has been formed by the cutting or etching method.

However, if such fragile material as a glass plate is cut, there tends to occur a cracking or chipping in the glass, which results in defective products and eventually a reduction in product yields. Moreover, if the ink passage is formed by the conventional cutting method, its interior wall face tends to be formed rough. Then, this rough surface causes pressure loss in ink passage thereby requiring large energy therefor and also deterioration in stability and evenness of ink delivery. On the other hand, if the ink passage formed e.g. of a glass plate is formed by the etching method, since the method is unsuitable for fine working, the same will disadvantageously limit the manufacturing precision.

In view of the above problems, in recent years, there has been an attempt to use a photosensitive resin for forming the ink passage.

However, if this photosensitive resin for forming the ink passage comprises conventional types such as novolak or polymethyl methacrylate, some problems remain. First, since it is difficult to form a thick coating pattern with a high aspect ratio and with a sharp edge, these photosensitive resin materials have never been put to actual use. Second, the conventional photosensitive resin materials are inferior in insulation and pressure-resistant characteristics and also readily subjected to expansion and deformation by ink penetration as is the case with the aforementioned other types of resin materials, thereby impairing the stable and even ink delivery.

SUMMARY OF THE INVENTION

The primary object of the present invention is to provide an ink jet printer head capable of jetting ink in a stable and even manner through an improvement of the ink passage achieved in consideration of the above-described inconveniences.

In order to accomplish said object, according to the present invention, in an ink passage, for providing its ink jet opening with ink-phobic property and for providing the other ink passage portion with ink-philic property, the jet opening and ink passage are coated with organic plasma polymer films. As a result, the ink passage portion with the ink-philic property achives an improved ink deliverability for better head response. On the other hand, the ink jet opening with the ink-phobic property achives significant reduction in disadvantageous excess ink dripping at this portion.

In addition to the above coating with organic plasma films, if a material is carefully selected for forming the ink passage, a further advantage will be achieved as described next.

That is, if the ink guide passage and the jet opening are formed of an ink-phobic material, the interior wall surface of the former is coated with an ink-philic type organic plasma polymer film. On the other hand, if the passage and jet opening are formed of an ink-philic material, the latter is coated with an ink-phobic type organic plasma polymer film. Furthermore, depending on the necessity, the ink guide passage interior wall surface is coated with the ink-philic type organic plasma polymer film while the ink jet opening is coated with the ink-phobic type organic plasma polymer film.

As described above, if an appropriate portion is coated with an ink-philic or ink-phobic type organic plasma polymer film depending on the type of material forming the ink guide passage and ink jet opening, the ink-philic property and ink-phobic property may be readily provided to the passage and opening respectively.

Further, the coating of organic plasma polymer film prevents physical expansion or quality deterioration of the base material because of its high resistance against penetration of ink. Also, the film may be firmly and reliably bonded with the base. Therefore, the printing head with this coating is highly resistant against influence of heat or electric field and also against mechanical vibrations associated with e.g. a piezo oscillator. Consequently, the improved printing head may achieve a stable and even ink jetting operation for an extended use life.

Incidentally, when the interior wall surface of the ink guide passage or the ink jet opening is coated with the ink-philic or ink-phobic organic plasma polymer film, the selection between the ink-philic type and ink-phobic type film is made depending on the type i.e. ink-philic or ink-phobic property of the employed ink per se. For example, if the ink is of a water-based type, the interior wall surface of the ink guide passage is coated with a type organic plasma polymer film whereas the ink jet opening is coated with a hydrophobic type film. On the other hand, if the ink is of an oil-based type, the arrangement is reversed; namely, coating the passage interior wall surface with the hydrophobic type while coating the opening with the hydrophilic type.

In forming the hydrophilic type organic plasma polymer film, through introduction of e.g. oxygen or nitrogen compound gas in the course of the plasma reaction, it is possible for the organic plasma polymer film to include oxygen atoms or nitrogen atoms as chemical modifying elements for achieving the desired hydrophilic or hydrophobic property.

In the above process, the amount of oxygen atoms or nitrogen atoms to be contained in the organic plasma polymer film may be adjusted by varying the amount of gas introduced during the plasma reaction. Preferrably, the content amount in either case should be no less than 0.1 at. %. If the amount is lower than this value, there is obtained no significant quality difference between the film with this element and that without the same. On the other hand, there is actually no particular upper limit. However, if the amount exceeds 20 at. %, this causes roughness in the organic plasma polymer film, which roughness obstructs the bonding between the film and the base. For this reason, the upper limit should preferably be no greater than 20 at. %.

Further, in forming the organic plasma polymer film (to be briefly referred to as a—C: X film, where X is the modifier atom) such as—C: H film or a—C: halogen film, if a large amount of rare gas such as argon or helium is mixed as a carrier gas into the organic plasma polymer film, the addition of the carrier gas advantageously enhances the hydrophilic property of the formed film. Also, the organic plasma polymer film may obtain the hydrophilic property, after formation thereof as the a—C: X film or a—C: halogen film, by bombarding the same with gas plasma such as oxygen or nitrogen.

On the other hand, in providing the organic plasma polymer film with the hydrophobic property, hydrocarbon gas, mixture gas of hydrocarbon gas and halogen atom containing hydrocarbon gas, or the halogen atom containing hydrocarbon compound gas or further a combination of these gases is introduced during the plasma reaction.

In the case of the hydrocarbon gas, the amount of hydrogen atoms contained in the polymer film should preferrably range between 10 and 60 at. % relative to the total amount of atoms. In the case of the halogen atom containing hydrocarbon compound gas, the amount of halogen atoms contained in the polymer film should preferably range between 0.1 and 60 at. %.

Furthermore, with respect to improvement on processing of ink passage for the purpose of achieving stable and even ink jetting feature, the present invention suggests forming the ink passage with a photosensitive polyimido resin.

The use of polyimido resin for forming the ink passage of an ink jet head makes it possible to form a thick film pattern with a high aspect ratio and a sharp edging which is suitable for ink delivery through the passage. Also, this photosensitive polyimido resin has further advantages of superior insulation and pressure-resistance characteristics and of high resistance against deformation by ink penetration.

In order to achieve a further advantage, considering the hydrophobic property of the photosensitive polyimido resin, if the employed ink comprises the water-based type, the surface of ink passage portion undergoes a gas plasma treatment with e.g. oxygen gas plasma or nitrogen gas plasma by the known method of vacuum glow discharge such that the photosensitive polyimido resin surface may obtain the ink-philic property relative to the water-based ink. On the other hand, if the employed ink comprises an oil-based type, the ink jet opening portion undergoes the above hydrophillic treatment to obtain the ink-phobic property relative to the oil-based ink.

Moreover, in order to further enhance the ink-phobic property or ink-philic property of the photosensitive polyimido resin surface relative to the water-based ink and oil-based ink respectively, as will be more particularly described later, the ink jet opening in the case of the water-based ink and the ink passage surface in the case of the oil-based ink are preferably coated with the hydrophobic organic plasma polymer film respectively.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Preferred embodiments of the present invention will be particularly described hereinafter with reference to the accompanying drawings.

Figure 1:
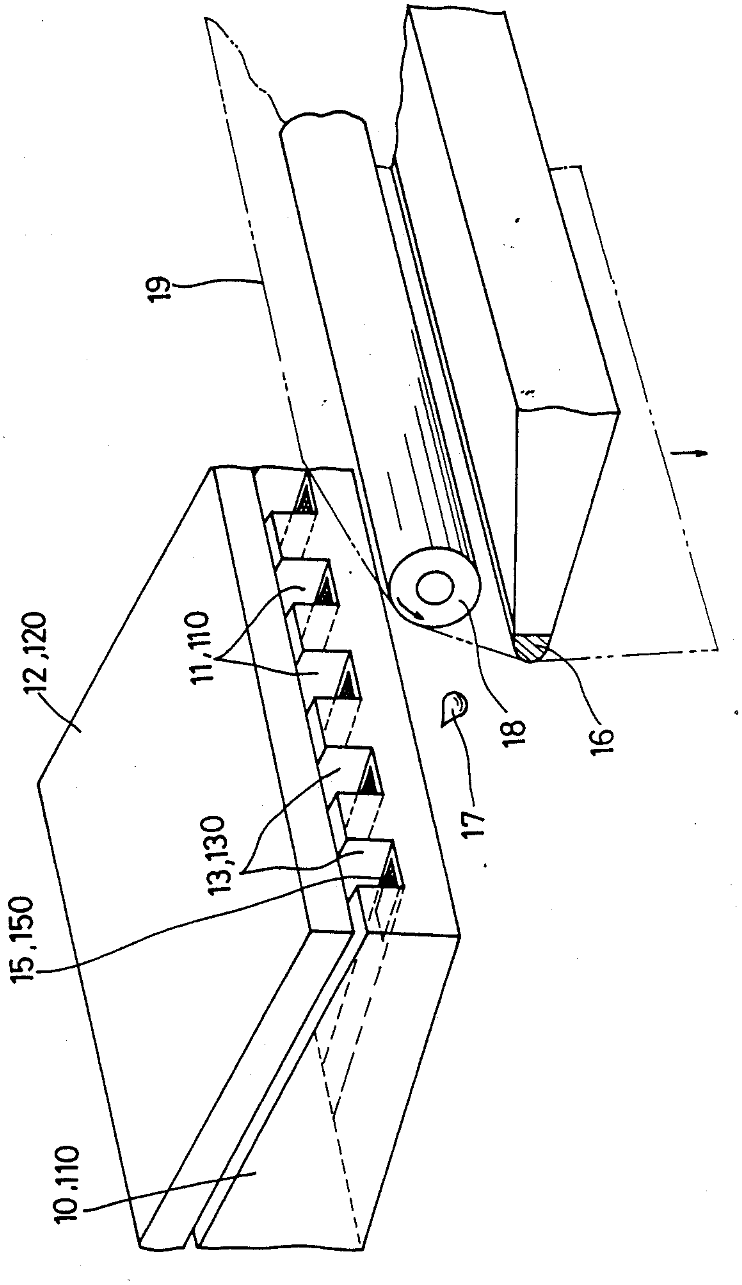
FIG. 1 is a perspective view illustrating an ink jet printing operation with a slit type ink jet head of the present invention.
Figure 2A:
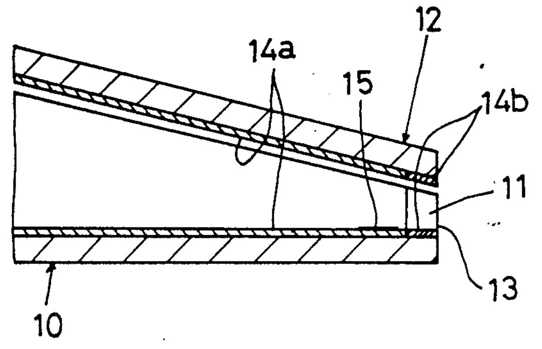
FIGS. 2A and 2B are a cross section and a front view of the ink jet head respectively.
Figure 2B:
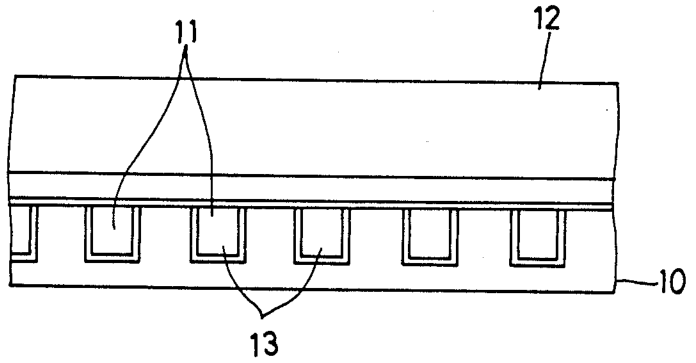

First, an ink jet head related to the present invention as embodied as a slit type head will be described with reference to FIGS. 1, 2A and 2B.

In this embodiment, a base 10 is constituted by a glass ceramic flat plate Macorle (manufactured by Corning Ltd.) with 2 mm thickness. After a side of this base 10 which is to form ink jet openings is tapered by cutting, a desired number of ink passage grooves 11 are cut with 60 μm pitch in the surface of this base 10, the grooves having a depth of 60 μm at the flat plate portion and a depth of 120 μm at the tapered ink jet openings. As the result, at the tapered side of the base, the desired number of ink jet openings 13 each with the dimension of 60 μm×60 μm are defined.

Then, at the respective ink passage grooves 11 defined in the base 10 and on an upper plate 12 to be disposed on this base 10, an ink-philic type organic plasma polymer film 14*a* is formed at the ink guide passage portions except for the ink jet openings 13 whereas these openings 13 are coated with an ink-phobic organic plasma polymer film 14*b*. Further, at each of bottoms of the ink passage grooves 11, an individual chrome electrode 15 with lateral dimentions of 30 μm×30 μm is formed by the known spattering method at a position 20 μm away from the ink jet opening 13.

In this particular embodiment, the employed ink comprises a commercially available water-based ink having a composition tabulated in Table 1 below. Therefore, the ink guide passage portions excluding the ink jet openings 13 are coated with the hydrophilic organic plasma polymer film while the ink jet openings 13 are coated with the hydrophobic organic plasma polymer film.

TABLE 1

| components | wt % |
|---|---|
| deionized water | 80.45 |
| polyethylene glycol | 4.60 |
| Direct Black GW (or BH) | 2.25 |
| monoethanolamine | 6.05 |
| methoxytriglycol | 4.55 |
| N—methylpyrrolidone | 2.00 |
| dioxane | 0.10 |

In the above formation of the hydrophilic organic plasma polymer film, a conventional plasma CVD device was used by two methods to be described next and a contact angle of the water-based ink was measured in each case.

In the first method, 1,3-butadiene monomer as the raw material (monomer) was introduced at a flow rate of 60 sccm and also hydrogen gas as a dilution gas was introduced at a flow rate of 300 sccm. Then, a plasma treatment was effected for 38.4 minutes at the room temperature under the conditions of 0.7 Torr pressure, 180 W pressure and 2 MHz frequency thereby forming a plasma polymer film of 5 μm thickness. Further, an oxygen plasma treatment was effected with oxygen gas in place of the hydrogen gas for 1 minute. To thus obtained hydrophilic organic plasma polymer film, the contact angle of the water-based ink was measured to be 18 degrees.

In the second method, isoprene monomer as the raw material (monomer) was introduced at a flow rate of 60 sccm and also hydrogen gas as a doping gas was introduced at a flow rate of 5 sccm and further hydrogen gas as a dilution gas was introduced at a flow rate of 250 sccm. Then, a plasma treatment was effected at the temperature of 40 degrees Celsius under the conditions of 0.9 Torr pressure, 180 W power and 800 KHz frequency thereby forming a plasma polymer film of 4 μm thickness. Further, an oxygen plasma treatment was effected with oxygen gas in place of the hydrogen gas for one and a half minutes. To thus obtained hydrophilic organic plasma polymer film, the contact angle of the water-based ink was measured to be 13 degrees.

With either of the hydrophilic organic plasma polymer films formed at the ink guide passage portions except the ink jet openings 13 by the above two methods, the contact angle of the water-based ink was so small as to permit smooth flow of the ink except for the openings 13.

Similarly, in the formation of the hydrophobic organic plasma polymer film, the conventional plasma CVD device was used by two methods to be described next and a contact angle of the water-based ink was measured in each case.

In the first method, perfluoropropylene monomer ($C_3F_6$) as the raw material (monomer) was introduced at a flow rate of 50 sccm and also hydrogen gas as a dilution gas was introduced at a flow rate of 250 sccm. Then, a plasma treatment was effected for 32.5 minutes at the room temperature under the conditions of 0.6 Torr pressure, 175 W power and 600 KHz frequency thereby forming a plasma polymer film of 5 μm thickness. To thus obtained hydrophobic organic plasma polymer film, the contact angle of the water-color ink was measured to be 99 degrees.

In the second method, tetrafluoro carbon ($CF_4$) gas as the raw material (monomer) was introduced at a flow rate of 60 sccm and also helium gas as a dilution gas was introduced at a flow rate of 300 sccm. Then, a plasma treatment was effected for 39 minutes at the temperature of 40 degrees Celsius under the conditions of 0.7 Torr pressure, 200 W power and 500 KHz frequency thereby forming a plasma polymer film of 4 μm thickness. To thus obtained hydrophobic organic plasma polymer film, the contact angle of the water-color ink was measured to be 110 degrees.

With either of the hydrophobic organic plasma polymer films formed at the ink jet opening portions by the above two methods, the contact angle of the water-based ink was so large as to effectively prevent dripping of the water-based ink at these ink jet openings 13.

Incidentally, if the employed ink comprises an oil-based type having a composition tabulated in Table 2 below, generally the oil-based ink has an ink-philic property to the hydrophobic organic plasma polymer film while the same has an ink-phobic property to the hydrophilic organic plasma polymer film. Therefore, in this case in contrast to the above-described case of water-based ink, the ink guide passage portions excluding the ink jet openings 13 are coated with the hydrophobic organic plasma polymer film while the ink jet openings 13 are coated with the hydrophilic organic plasma polymer film.

TABLE 2

| components | wt % |
|---|---|
| methanol | 50.00 |
| ethanol | 30.65 |
| Direct Black GW | 1.50 |
| Capamine Black ESA | 0.75 |
| polyethylene glycol | 4.50 |
| methooxytri glycol | 4.50 |
| polyvinyl butyral | 8.00 |
| dioxane | 0.10 |

Further, in this embodiment, the upper plate 12 was placed on the base 10 with a slight space therebetween so as to prevent ink clogging between the respective ink passage grooves 11 and the upper plate 12.

Next, the above ink jet head forming material was arranged such that its jet openings 13 each having an operative electrode at its leading end face an opposing electrode 16 with an interdistance of 185 μm. Then, an ink jet printing operation was carried out with this printing head.

In this ink jet printing operation, an electrode pulse impressing negative voltage of −200 V was impressed on the individual electrode 15 disposed at the bottom of the groove 11. More particularly, the individual electrodes 15 disposed at the bottom of the respective grooves 11 are divided into a plurality of blocks each including several tens or hundreds of the electrodes 15 and also a driving IC. Then, the pulse voltage of −200 V was impressed on the individual electrodes 15 by the driving IC associated therewith. On the other hand, the opposing electrode 16 was uniformly impressed with a positive pulse voltage of +400 V thereby electrostatically attracting the negative-charged ink 17 jetted through the ink jet openings 13 to be applied to a recording sheet 19 fed by a roller 18 on the side of the ink jet head.

As the result, with this ink jet head, the ink was jetted stably and evenly, and a high-quality ink jet image was formed on the sheet.

Incidentally, in this embodiment, the glass ceramic flat plate was used as the base 10 which was then cut with the dicing saw. Alternatively, if it is desired to form the ink passage grooves 11 with a smaller pitch of 20 to 40 μm for increasing the pixcell density, such cutting processing is difficult. In this case; therefore, the ink passage grooves 11 may be defined through etching of a film of e.g. silicon dioxide. Further, the grooves may be also formed through casting or stampering the base with e.g. a resin from a metal mould formed by e.g. laser beam treatment.

Figure 3A:
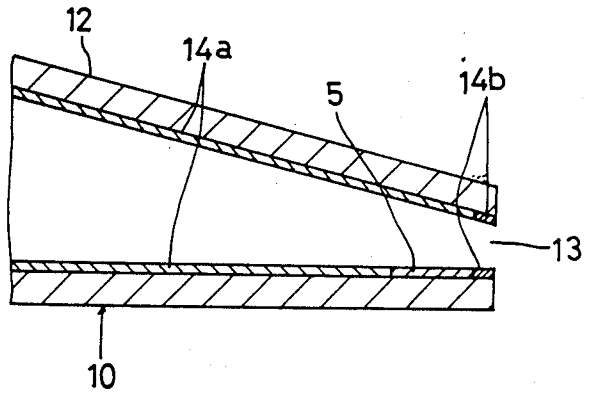
FIGS. 3A and 3B are a cross section and a front view respectively of an ink jet head according to an alternate embodiment.
Figure 3B:
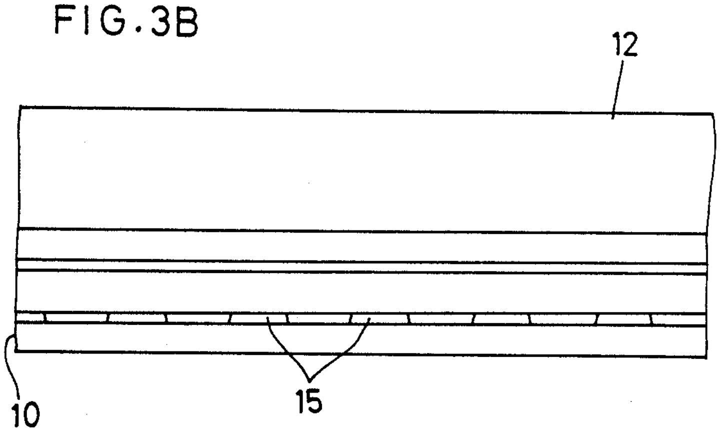

Next, another slit type head according to an alternate embodiment of the present invention will be described with reference to FIGS. 1, 3A and 3B. This slit type head differs from the foregoing type in that the former has no ink passage grooves 11 but has a slit type ink jet openings 13 instead. The rest of the constructions are the same. That is, the ink guide passage portions except the jet openings 13 are coated with the ink-philic type organic plasma polymer film 14*a* while the openings 13 are coated with the ink-phobic type organic plasma polymer film 14*b*.

Figure 4:
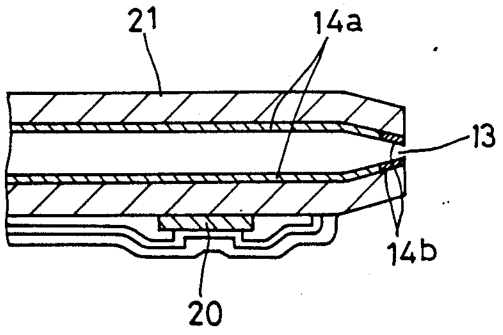
FIG. 4 is a cross section of an ink jet head of a further alternate embodiment.

Further, FIG. 4 shows a bubble jet type ink jet head operable to jet ink by means of pressure developed as a heating resistance 20 generates bubbles inside a nozzle 21.

In the case of this bubble jet type ink jet head similarly to the foregoing embodiment, an interior wall surface of the nozzle 21 except the ink jet openings 13 is coated with the ink-philic type organic plasma polymer film 14*a* while the openings 13 are coated with the ink-phobic type organic plasma polymer film 14*b*.

Figure 5:
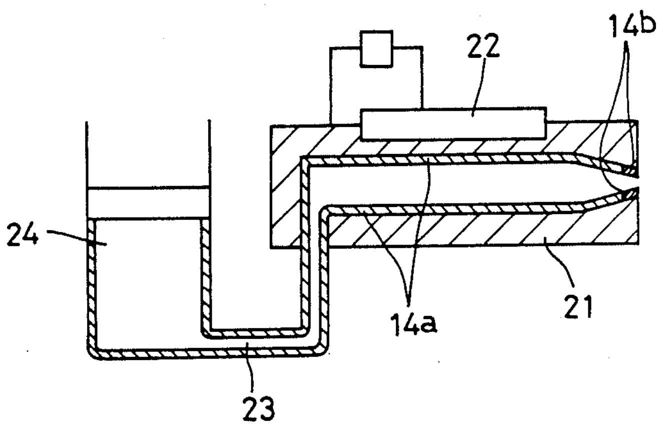
FIG. 5 is a cross section of an ink jet head of a still further alternate embodiment.

Moreover, FIG. 5 shows a pulse jet type ink jet head utilizing a piezo-electric device 22.

In the case of this pulse jet type ink jet head, the ink-philic type organic plasma polymer film 14*a* is formed not only on the interior wall surface of the nozzle 21 except the jet openings 13 but also on interior wall surfaces of a capillary tube 23 into which the ink is guided and of an ink tank 24. On the other hand, the ink jet openings 13 are coated with the ink-phobic organic plasma polymer film 14 as is the case with the preceding embodiments.

Next, a further alternate embodiment of an ink jet head having ink passages formed of a photosensitive polyimido resin will be described.

First, as the photosensitive polyimido resins, photoneece UR-3600 (manufactured by Torey Ltd.) as a positive type resin and probimide 348 (manufactured by Chiba-Geigy Ltd.) as a negative type resin were prepared.

Second, these two type of photosensitive polyimido resins respectively were formed into a thickness of 50 μm by application or casting in a frame. Then, with using a high-voltage mercury lamp with the energy of approximately 830 mJ/cm$^2$, thus prepared resin films underwent UV exposures by a positive type exposure pattern for the positive type photosensitive polyimido resin and by a negative type exposure pattern for the negative type photosensitive polyimido resin, respectively.

With the photochemical reaction of the positive type photosensitive polyimido resin and the photopolymerization reaction of the negative type photosensitive polyimido resin, ink groove passages each with a width and a depth both of approximately 49 μm were defined.

A further experiment was conducted for comparison with a Cresolnovolak (manufactured by Sumitomo Kagaku Kogyo Ltd.) which is a positive type novolak type photosensitive resin. In this case; however, the formed grooves had only shallow depth of approximately 8 μm. Also, when a further attempt was made to increase the depth, this only resulted in too inconspicuous pattern for practical use as an ink passage of ink jet head. Incidentally, although there may be slight difference from one type or specification of the ink jet printer to another, the groove depth must always be no less than 30 to 40 μm for forming a practically usable image. Still further experiments were conducted with other non-polyimido photosensitive resins. However, in these cases also, the formed grooves were too shallow for practical use.

In this embodiment as is the case with the preceding embodiments, in the base 10*o* formed of the photosensitive polyimido resin, a desired number of ink passage grooves 11*o* each with a width and a depth of 49 μm were defined with 60 μm pitch.

Figure 6A:
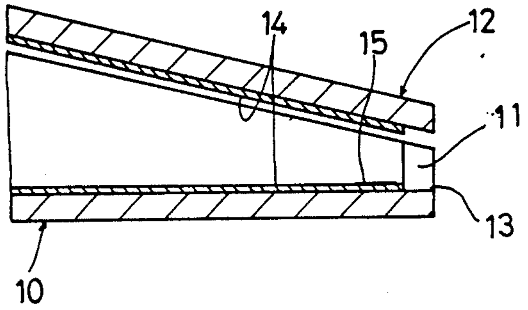
FIGS. 6A and6B are a cross section and a front view showing a portion of the ink jet head formed of a photosensitive polyimido resin.
Figure 6B:
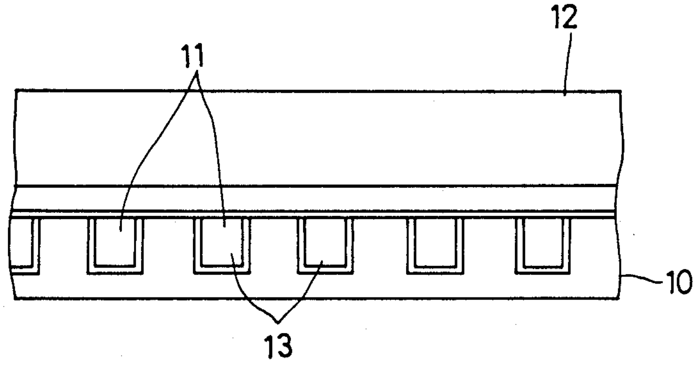

Next, as shown in FIGS. 6A and 6B, on an upper plate 12 to be disposed on the ink passage grooves 11 and the base 10, the ink passage portion except the ink jet openings 13 was coated with the organic plasma polymer film 14 having the ink-philic property to the water-based ink while individual chrome electrodes 15 with a lateral dimension of 30 μm×30 μm were formed on a bottom of each groove 11 at a position 20 μm distant from the jet opening 13.

In this embodiment also, in the formation of the organic plasma polymer film 14, the commercially available and conventional plasma CVD device was used And, a plasma treatment was carried out for two and a half minutes at the room temperature with a carrier gas of helium gas at a flow rate of 100 sccm, butadiene monomer at 80 sccm and oxygen gas at 12 sccm under the conditions of 0.7 Torr pressure, 90 W power and 2.0 MHz frequency.

After the above film formation, measurements were made for the contact angles of the water-based ink between the ink passage portion coated with the ink-philic organic plasma polymer film 14 and the ink jet opening 13 un-coated with the same. The water-based ink had the same composition as tabulated in Table 1.

The measurement revealed the contact angle at the ink passage portion coated with the organic plasma polymer film 14 was 14 degrees which is small enough for smooth ink passage whereas the angle at the ink jet opening un-coated with the film 14 was 80 degrees which is large enough to prevent ink dripping at this portion.

These experiments results similar to those in the foregoing embodimets prove that the ink jet heads according to the present invention are capable of forming high-quality ink jet printing images through stable and even ink jet delivery.

Incidentally, although the above embodiments dealt with the water-based ink, it is also possible to use an oil-based ink. In this case, the reverse arrangement should be made; namely, forming the organic plasma polymer film 14 having the ink-phobic property to the oil-based ink on the ink jet openings 13 such that the ink passage portion may obtain the oil-ink-philic property while the ink jet opening may obtain the oil-ink-phobic property.

What is claimed is:

1. A printing head for use in an ink jet printer, said printing head having an ink passage with an ink jet opening and an ink guide portion, wherein said ink jet opening is coated with an ink-phobic organic plasma polymer film and/or said ink guide portion is coated with an ink-philic organic plasma polymer film.

2. A printing head as claimed in claim 1, wherein said organic plasma polymer film comprises a—C: H film or a—C: X film where X is an halogen atom.

3. A printing head as claimed in claim 1 for use with a water-based ink, wherein said ink-philic organic plasma polymer film contains oxygen atoms and/or nitrogen atoms while said ink-phobic organic plasma polymer film contains halogen atoms.

4. A printing head as claimed in claim 1 for use with an oil-based ink, wherein said ink-philic organic plasma polymer film contains halogen atoms while said ink-phobic organic plasma polymer film contains oxygen atoms and/or nitrogen atoms.

5. A printing head for use in an ink jet printer, said printing head comprising an ink passage formed of a photosensitive polyimido resin.

6. A printing head as claimed in claim 5, wherein said ink passage includes an ink jet opening and an ink guide portion, said ink jet opening being coated with an ink-phobic organic plasma polymer film and/or said ink guide portion being coated with an ink-philic organic plasma polymer film.

7. A printing head as claimed in claim 6, wherein said organic plasma polymer film comprises a—C: H film or a—C: X film where X is an halogen atom.

8. A printing head as claimed in claim 6 for use with a water-based ink, wherein said ink-philic organic plasma polymer film contains oxygen atoms and/or nitrogen atoms while said ink-phobic organic plasma polymer film contains halogen atoms.

9. A printing head as claimed in claim 6 for use with an oil-based ink, wherein said ink-philic organic plasma polymer film contains halogen atoms while said ink-phobic organic plasma polymer film contains oxygen atom and/or nitrogen atoms.

10. In an ink jet printing system for forming an ink image on a recording sheet by impressing a pulsate voltage between a plurality of individual electrodes disposed independently on a printing head and an opposing electrode facing the individual electrodes across the recording sheet thereby jetting the ink positioned adjacent the individual electrodes towards the opposing electrode, said printing head having:

a head body formed of a photosensitive polyimido resin;

a plurality of grooves defined in the head body; and an upper plate to be disposed on the head body for covering said grooves for forming a plurality of ink passages;

wherein an ink jet opening area of said ink passage is coated with an ink-phobic organic plasma polymer film while a remaining area of said passage is coated with an ink-philic organic plasma polymer film, and said individual electrodes are disposed on bottom faces of said respective ink passage grooves.

* * * * *